(12) United States Patent
Suzuki

(10) Patent No.: US 7,210,496 B2
(45) Date of Patent: May 1, 2007

(54) COMPRESSED GAS STORAGE SYSTEM

(75) Inventor: Hiroyoshi Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/391,291

(22) Filed: Mar. 29, 2006

(65) Prior Publication Data

US 2006/0219298 A1  Oct. 5, 2006

(30) Foreign Application Priority Data

Mar. 29, 2005  (JP) ............ P.2005-096118

(51) Int. Cl.
  *F16K 49/00* (2006.01)
  *F16K 31/02* (2006.01)
  *B67D 5/62* (2006.01)
(52) U.S. Cl. .............. 137/338; 137/339; 137/375; 251/129.15; 222/149.2; 222/149.6
(58) Field of Classification Search ............... 137/338, 137/339, 375; 251/129.15; 222/146.2, 146.6
  See application file for complete search history.

(56) References Cited

U.S. PATENT DOCUMENTS 2,114,961 A * 4/1938 Gille ................ 137/339
2,608,205 A * 8/1952 Proctor .............. 137/375
3,253,611 A * 5/1966 Cummins ............ 137/338
3,720,227 A * 3/1973 Curran .............. 137/339
3,827,603 A * 8/1974 Reighard et al. ...... 222/146.5
4,197,966 A * 4/1980 Wadensten et al. ........ 222/1
4,452,269 A * 6/1984 Kindermann ........... 137/338
4,750,514 A * 6/1988 Omori et al. .......... 137/339
4,932,561 A * 6/1990 Boxall ................ 222/54
5,718,259 A * 2/1998 Miyake et al. ........ 137/338

FOREIGN PATENT DOCUMENTS

JP  6-508422 A  9/1994

* cited by examiner

*Primary Examiner*—A. Michael Chambers
(74) *Attorney, Agent, or Firm*—Arent Fox LLP

(57) ABSTRACT

A compressed gas storage system includes a gas tank formed for storing therein compressed gas, a gas discharge path provided in the gas tank, a solenoid valve connected to the gas discharge path and disposed in an interior of the gas tank for controlling the flow of compressed gas that goes out of the gas tank and a control unit to which the solenoid valve is connected. An outer circumferential surface of the solenoid valve is covered with a cover, so that a space defined between the cover and the outer circumferential surface is made to communicate with the gas discharge path to thereby form a gas flow path. A heat transfer fin is formed on an inner circumferential surface of the cover in such a manner as to extend radially inwardly, so as to be brought into contact with the outer circumferential surface of the solenoid valve.

12 Claims, 8 Drawing Sheets

COMPRESSED GAS STORAGE SYSTEM

The present application claims foreign priority based on Japanese Patent Application No. 2005-096118, filed Mar. 29, 2005, the content of which is incorporated herein by reference.

BACKGROUND OF THE INVENTION

1. Technical Field

The present invention relates to a compressed gas storage system in which a solenoid valve is incorporated in a gas tank which stores therein compressed gas.

2. Related Art

A compressed gas storage system is such as to be installed on, for example, a motor vehicle, and in the system, a solenoid valve is incorporated in a gas tank which stores therein compressed gas, and compressed gas is supplied by opening the solenoid valve within the gas tank (for example, JP-T-6-508422 (page 6, FIGS. 2, 3) (the term "JP-T" as used herein means a published Japanese Translation of a PCT patent application) which is referred as Patent Document No. 1).

Patent Document No. 1 will be described based on the following drawing.

FIGS. 8(a), 8(b) are drawings which explains a basic configuration of the related art, and a related art anti-collision electromagnetic valve or solenoid valve 101 for a natural gas-driven passenger vehicle includes a main valve element 104 mounted on a collar 103 of a pressure vessel 102, a fill port 105, a feed-through hole 106 and an outlet port 107 which are formed in the main valve element 104, a central flow communication passage 108 and a solenoid poppet valve assembly 109 which is screwed into the pressure vessel 102 at a central portion thereof for connection with the main valve element 104.

The solenoid poppet valve assembly 109 has a solenoid 111, a seal 112 and a passage 113, and since the seal 112 is separated when the solenoid 111 is energized, natural gas flows to the engine side through the passage 113, the flow communication path 108, and the outlet port 107 (an outlet coupling 114).

In the anti-collision solenoid valve 101 described in Patent Document No. 1, however, when the solenoid 111 is energized to separate the seal 112 so as to allow natural gas to flow out, the temperature of natural gas so flowing out decreases due to Simon expansion, and since the seal 112 is cooled by the natural gas which flows out, the temperature of the seal 112 is decreased, whereby the sealing property resulting when the solenoid valve 101 is closed is decreased.

Then, to cope with this, although it is considered, for example, to change the material of the seal 112 to a special material which can deal with low temperatures or to heat the portion of the solenoid poppet valve assembly 109 which is screwed into the collar 113 of the pressure vessel 102, it is difficult to transfer heat as deep as the seal 112, and on the other hand, there has been a demand for a construction which can deal with the problem without using special materials.

SUMMARY OF THE INVENTION

An object of the invention is to provide a compressed gas storage system which can enhance the sealing property of the solenoid valve without changing the material of the seal material.

However, the present invention need not achieve the above object, and other objects not described herein may also be achieved. Further, the invention may achieve no disclosed objects without affecting the scope of the invention.

With a view to solving the object, according to a first aspect of the invention, there is provided a compressed gas storage system including a gas tank formed for storing therein compressed gas, a gas discharge path provided in the gas tank, a solenoid valve connected to the gas discharge path and disposed in an interior of the gas tank for controlling the flow of compressed gas that goes out of the gas tank and a control unit to which the solenoid valve is connected, wherein an outer circumferential surface of the solenoid valve is covered with a cover, so that a space defined between the cover and the outer circumferential surface is made to communicate with the gas discharge path to thereby form a gas flow path.

According to a second aspect of the invention, there is provided a compressed gas storage system as set forth in the first aspect of the invention, wherein an outer circumferential surface of the cover is covered with a heat insulation material.

According to a third aspect of the invention, there is provided a compressed gas storage system as set forth in the first or second aspect of the invention, wherein a heat transfer fin is formed on an inner circumferential surface of the cover in such a manner as to extend radially inwardly, so as to be brought into contact with the outer circumferential surface of the solenoid valve.

According to a fourth aspect of the invention, there is provided a compressed gas storage system as set forth in the first, second or third aspect of the invention, wherein a temperature detection unit for detecting a temperature within the gas tank is disposed in the vicinity of the solenoid valve, whereby when a temperature detected by the temperature detection unit is lower than a temperature set in the control unit in advance, the control unit increases the amount of energization.

According to the first aspect of the invention, since there is provided the compressed gas storage system including the gas tank formed for storing therein compressed gas, the gas discharge path provided in the gas tank, the solenoid valve connected to the gas discharge path and disposed in the interior of the gas tank for controlling the flow of compressed gas that goes out of the gas tank and the control unit connected to the solenoid valve, wherein the outer circumferential surface of the solenoid valve is covered with the cover, so that the space defined between the cover and the outer circumferential surface is made to communicate with the gas discharge path to thereby form the gas flow path, compressed gas which passes through the gas flow path can be heated by heat generated by the solenoid valve. As a result, a decrease in temperature of a seated material fitted in a front end of a plunger of the solenoid valve can be suppressed, and this can offer an advantage where the sealing property of the solenoid valve can be enhanced without changing the material of the sea material.

According to the second aspect of the invention, since the outer circumferential of the cover is covered with the heat insulation material, a decrease in the temperature of the cover can be suppressed, whereby the temperature of compressed gas which passes through the gas flow path can be increased in a further ensured fashion. Consequently, this configuration can offer an advantage where the sealing property of the solenoid valve can be enhanced.

According to the third aspect of the invention, since the heat transfer fin is formed on the inner circumferential surface of the cover in such a manner as to extend radially inwardly, so as to be brought into contact with the outer circumferential surface of the solenoid valve, heat is transferred from the solenoid valve directly to the heat transfer fin to heat the fin, whereby the temperature of compressed gas which passes through the gas flow path can be increased. As a result, a decrease in temperature of the seated material fitted in the front end of the plunger of the solenoid valve can be suppressed, and this can offer an advantage where the sealing property of the solenoid valve can be enhanced without changing the material of the sea material in a further ensured fashion.

According to the fourth aspect of the invention, since the temperature detection unit for detecting a temperature within the gas tank is disposed in the vicinity of the solenoid valve, whereby when a temperature detected by the temperature detection unit is lower than a temperature set in the control unit in advance, the control unit increases the amount of energization, the temperature of the solenoid valve is increased in accordance with the temperature of compressed gas, whereby the temperature of compressed gas which passes through the gas flow path can be increased in a further endured fashion. Consequently, this configuration can offer an advantage where the sealing property of the solenoid valve can be enhanced.

DETAILED DESCRIPTION OF THE INVENTION

Figure 1:
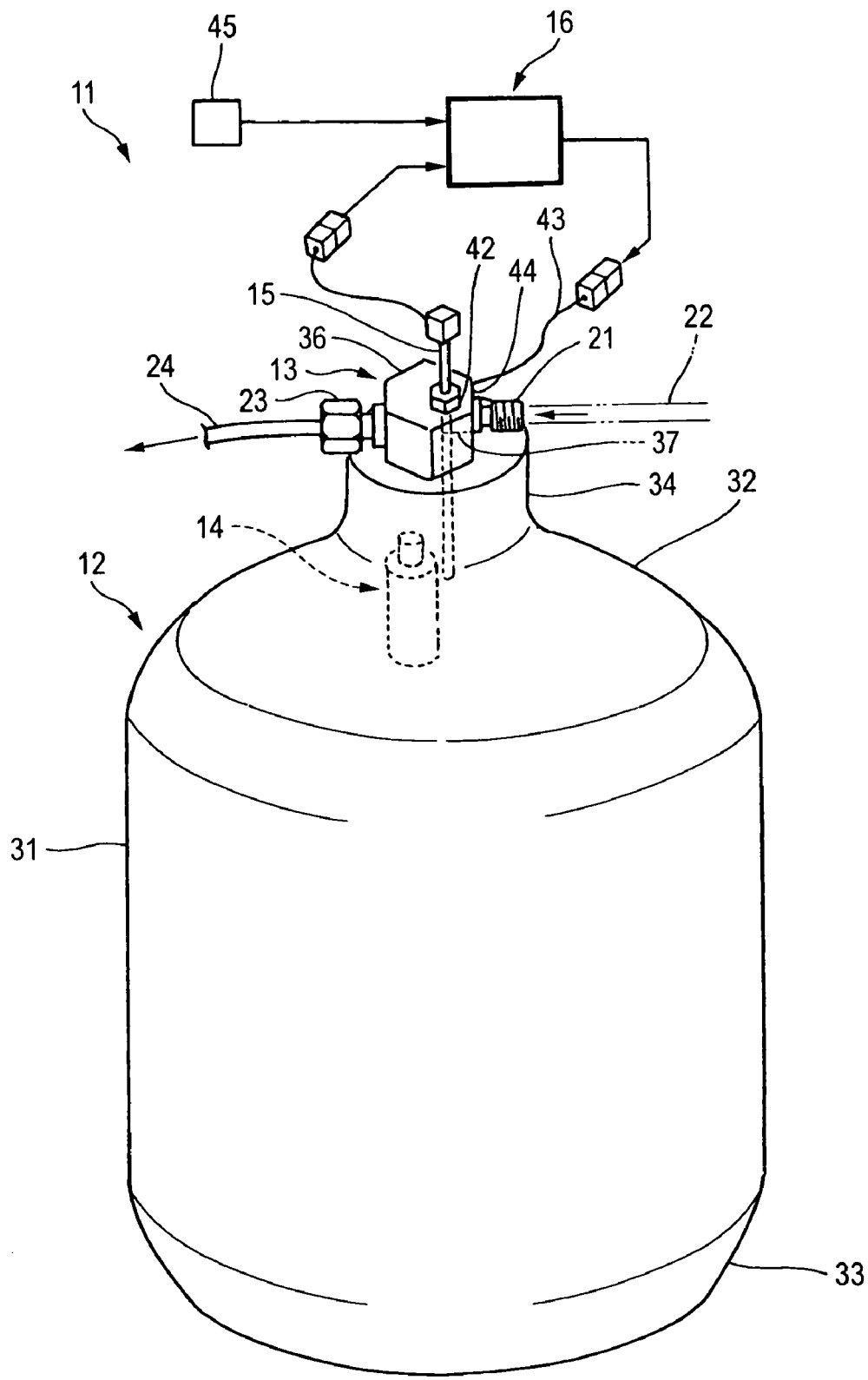
FIG. 1 is a perspective view of an exemplary, non-limiting compressed gas storage system of the invention.

A best mode for carrying out of the invention will be described based on the accompanying drawings. Note that the drawings are to be viewed in a direction in which reference numerals imparted therein stand in their normal postures.

FIG. 1 is a perspective view of a compressed gas storage system of the invention.

The compressed gas storage system includes a gas tank 12, a coupling unit 13 mounted on the gas tank 12, a solenoid valve 14 connected to the coupling unit 13, a thermocouple 15 mounted on the coupling unit 13 and a control unit 16 for controlling the solenoid valve 14, whereby compressed gas is filled thereinto via a tube 22 connected to an inlet coupling 21 of the coupling unit 13 and is supplied from the gas tank via a tube 24 connected to an outlet coupling 23 of the coupling unit 13.

Compressed gas is, for example, hydrogen gas compressed to a high pressure (350 kgf/cm$^2$ G or 700 kgf/cm$^2$ G).

The gas tank 12 is made up of, for example, a shell 31 which is formed to a desired diameter, a top head 32 which is integrally attached to one end of the shell 31 and a bottom head 33 which is integrally attached to the other end of the shell 31 and stands for a desired pressure, for example, 350 kgf/cm$^2$ G or 700 kgf/cm$^2$ G.

A nozzle portion 34 is mounted at a center of the top head 32 for connection of the coupling unit 13 thereto.

A female thread portion 35 (refer to FIG. 2) is machined on the nozzle portion 34 for mounting the coupling unit 13 thereon.

Note that the construction of the gas tank 12 that has been described above is one example thereof, and the construction (for example, a singly layer, multiple layers, thickness), material (steel, aluminum alloy, resin, glass) and manufacturing method of the gas tank 12 can be selected arbitrarily.

The coupling unit 13 includes a filling valve unit 37 provided on a main body 36 of the coupling unit 13, a fill flow path 38 (refer to FIG. 2) which guides compressed gas which has passed through the filling valve unit 37 into the gas tank 12, a gas discharge path 41 (refer to FIG. 2) which guides compressed gas within the gas tank 12 to the outlet coupling 23, a thermocouple mount portion 42 on which the thermocouple 15 is mounted, and a lead-in portion 44 from which a cable 43 of the solenoid valve 14 is drawn in.

The filling valve unit 37 can be an existing one, which opens by virtue of the pressure of compressed to be filled when filling compressed gas into the gas tank 12 and closes by virtue of the pressure of compressed gas residing in the gas tank 12 when the fill of compressed gas has been completed.

The control unit 16 is such as to control the solenoid valve 14 based on conditions set therein in advance and controls the solenoid valve 14 based on, for example, information from a control device 45, information from the thermocouple 15 and the conditions set therein in advance.

The control device 45 is, for example, a switch or keys which are disposed on an instrument panel or in the vicinity of a driver's seat of a motor vehicle.

Figure 2:
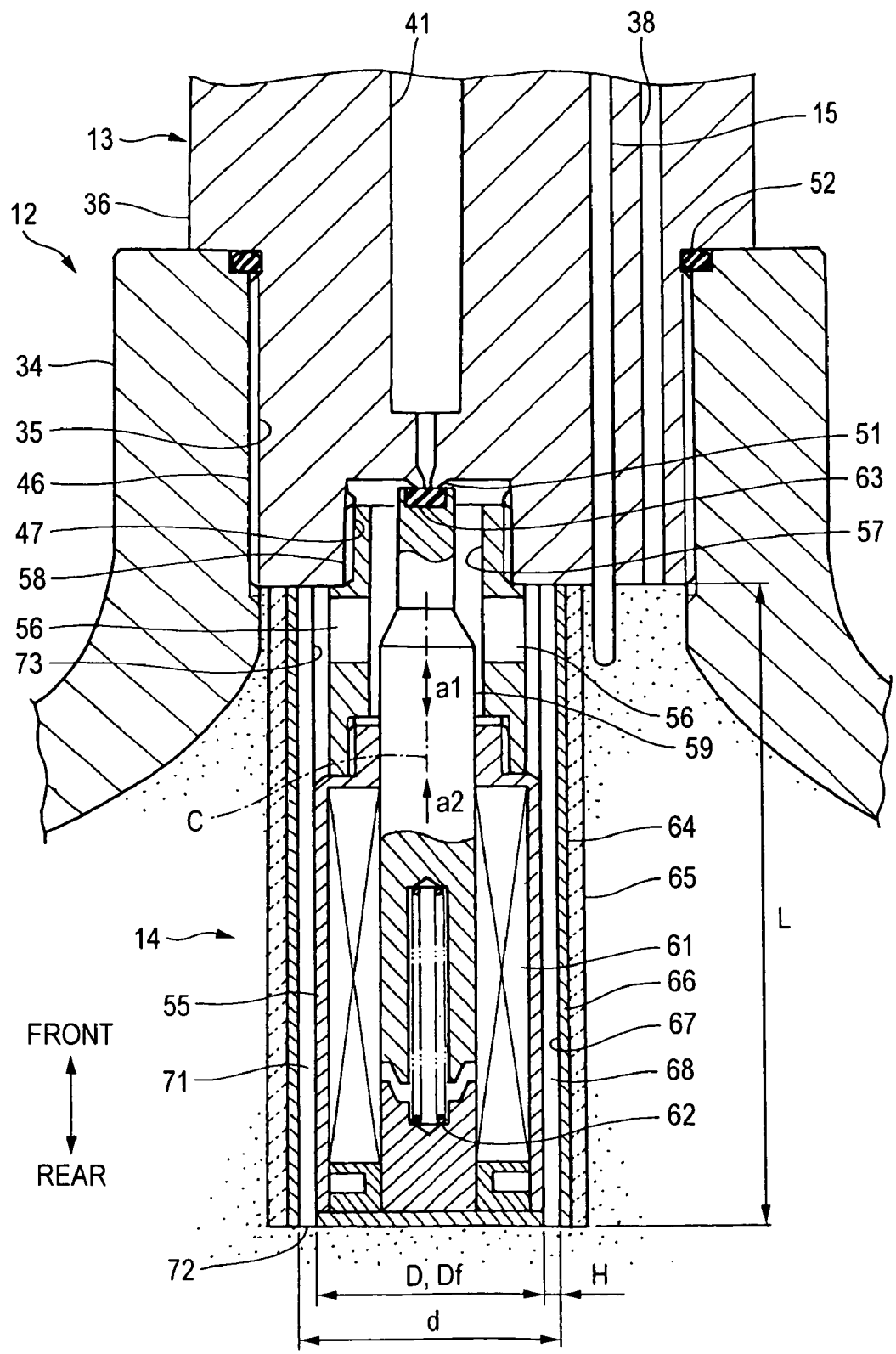
FIG. 2 is a sectional view of an exemplary, non-limiting solenoid valve used in the compressed gas storage system of the invention.

FIG. 2 is a sectional view of the solenoid valve used in the compressed gas storage system of the invention and shows a state in which the solenoid valve 14 is mounted on the coupling unit 13 of the gas tank 12. Note that an end of the solenoid valve 14 which is opened and closed is to be regarded as "front" and an opposite end to the "front" as "rear".

In addition, in the coupling unit 13, a male thread portion 46 is formed on the main body 36 thereof which corresponds to the female thread portion 35 formed on the gas tank 12, a female thread portion 47 is formed on an end face thereof for mounting the solenoid valve 14 therein, and a seat portion 51 is formed on a bottom thereof which continues to the female thread portion 47, whereby a gas discharge path 41 is made to communicate with the seat portion 51.

Reference numeral 52 denotes an O-ring which is interposed between the coupling unit 13 and the nozzle portion 34 of the gas tank 12.

The solenoid valve 14 includes a cylindrical solenoid case 55, outlets 56, 56 (refer to FIG. 4) which are opened in the solenoid case, a flow path portion 57 formed in the solenoid case 55, a male thread portion 58 on the solenoid case 55 which corresponds to the female thread portion 47 of the coupling unit 13, a plunger 59 which fits in the solenoid case 55 in such a manner as to freely slide therein (in directions indicated by arrows a1), an electromagnetic coil 61, a return spring 62 mounted at a rear end of the plunger 59 so as to impart a pressing force (in a direction indicated by an arrow a2) to the plunger 59, a seated material 63 which is fitted in a front end of the plunger 59 to be seated on the seat portion 51, a cover 64 which covers an outside of the solenoid case 55, and a heat insulation material 65 which covers an outside of the cover 64, whereby when not energized, the plunger 59 is pressed against the seat portion 51 by the return spring 62 so that the seated material 63 is pressed against the seat portion 51, the solenoid valve 14 thereby being closed. Reference character D denotes an outside diameter of the solenoid case 55 and L a mount length of the solenoid valve 14.

The electromagnetic coil 61 may be any of existing electromagnetic coils which can satisfy desired conditions, and the specification is arbitrary.

The seated material 63 may be any of existing materials which can be seated on the seat portion to satisfy desired conditions.

The thermocouple 15 may be any of existing thermocouples which can detect the temperature of high-pressure compressed gas filled in the gas tank 12 within a predetermined temperature range, and the specification thereof is arbitrary.

The cover 64 is such as to form a cylindrical main body 66, on an inner circumferential surface 67 of which fins 68 . . . ( . . . denotes a plural number, and this will be true hereinafter.) are formed. Reference character d denotes an inside diameter of the cover 64 which constitutes a diameter of the inner circumferential surface 67, H the height of the fin 68, and Df a bore of the cover 64 which is defined by the fins 68 . . . .

The bore Df of the cover 64 is set such that the bore substantially coincides with the outside diameter D of the solenoid valve 55 or the cover 64 adheres at the fins 68 thereof to the outside of the solenoid valve 55, whereby the cover 64 is fitted over the solenoid 55 using, for example, a press fit method or the like.

Figure 3:
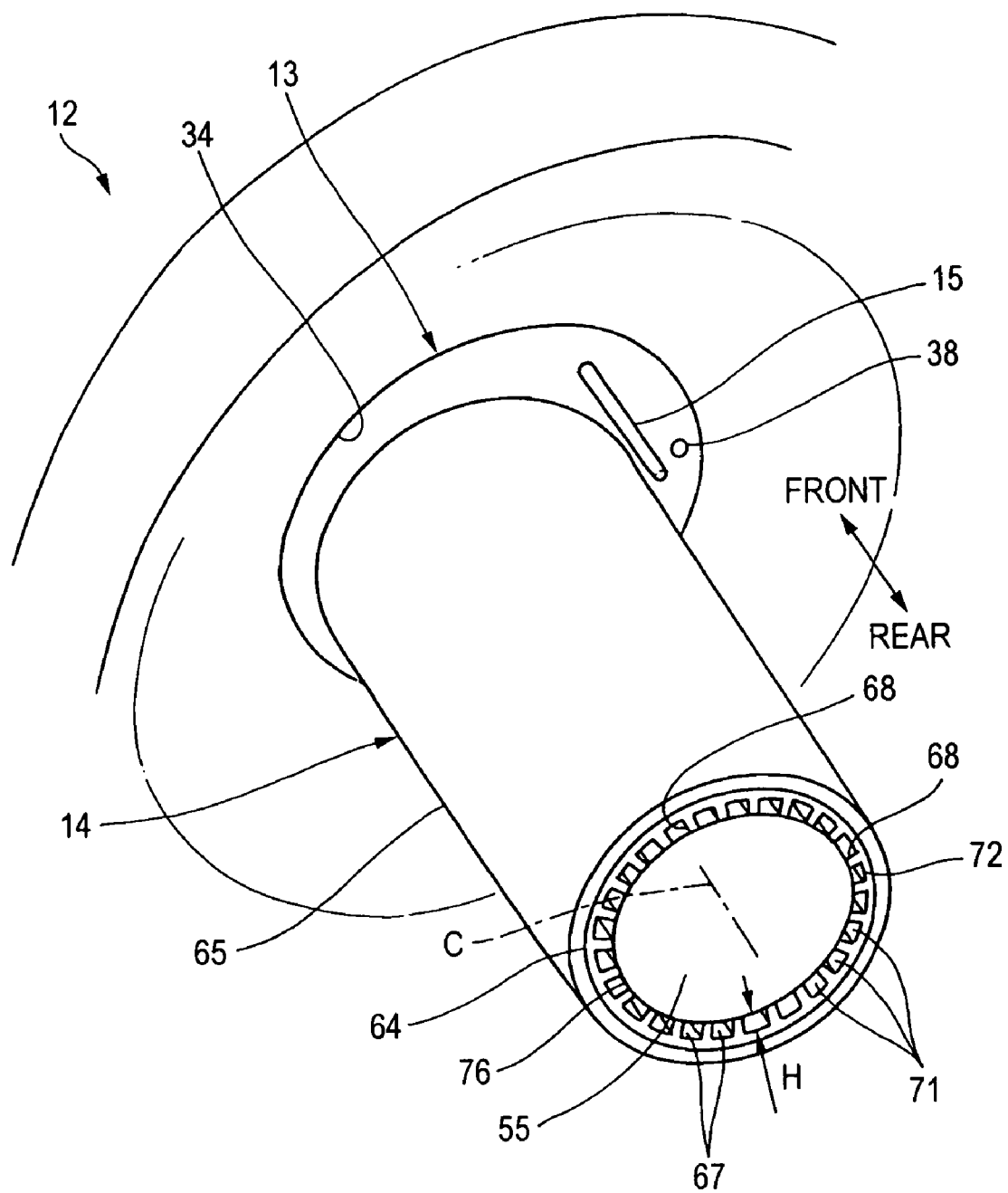
FIG. 3 is a perspective view of an inside of the exemplary, non-limiting compressed gas storage system of the invention.

FIG. 3 is a perspective view of an inside of the compressed gas storage system of the invention.

Figure 4:
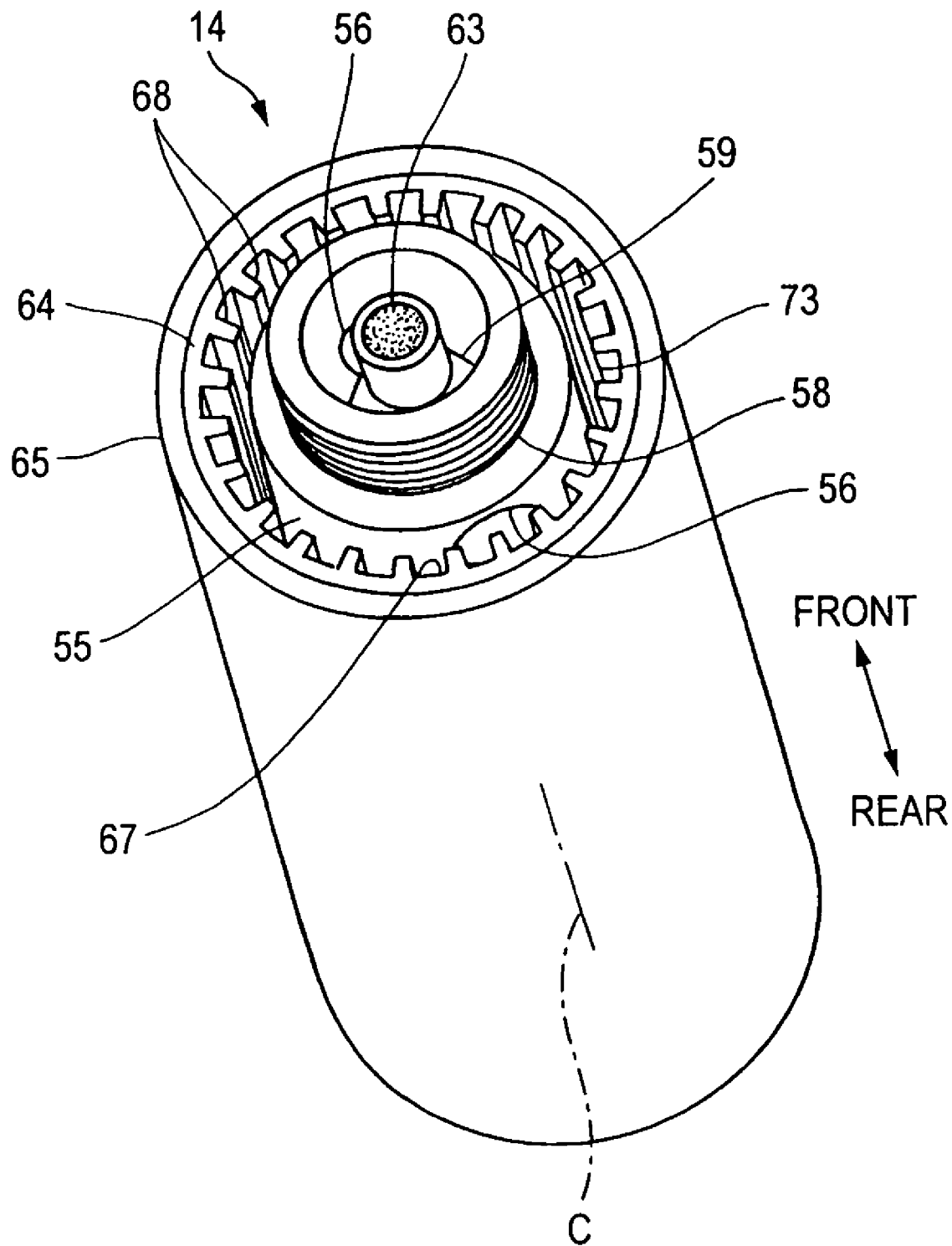
FIG. 4 is a perspective view of the exemplary, non-limiting solenoid valve used in the compressed gas storage system of the invention.

FIG. 4 is a perspective view of the solenoid valve used in the compressed gas storage system of the invention.

When fitted over the solenoid case 55, the cover 64 also defines gas flow paths 71 . . . which extend over a distance corresponding to the height H of the fin 68 between the inner circumferential surface 67 of the cover 64 and the solenoid case 55. In addition, the gas flow paths 71 . . . are divided further into a plural number by the fins 68 . . . .

In the gas flow path 71, an end thereof which is disposed at a rear end of the solenoid valve 14 constitutes an inlet portion 72 thereof, and the other end thereof which is disposed at a front end of the solenoid valve 14 constitutes an outlet portion 73 thereof.

The plurality of outlets 56 . . . are disposed along a circumference of the solenoid case 55.

Figure 5:
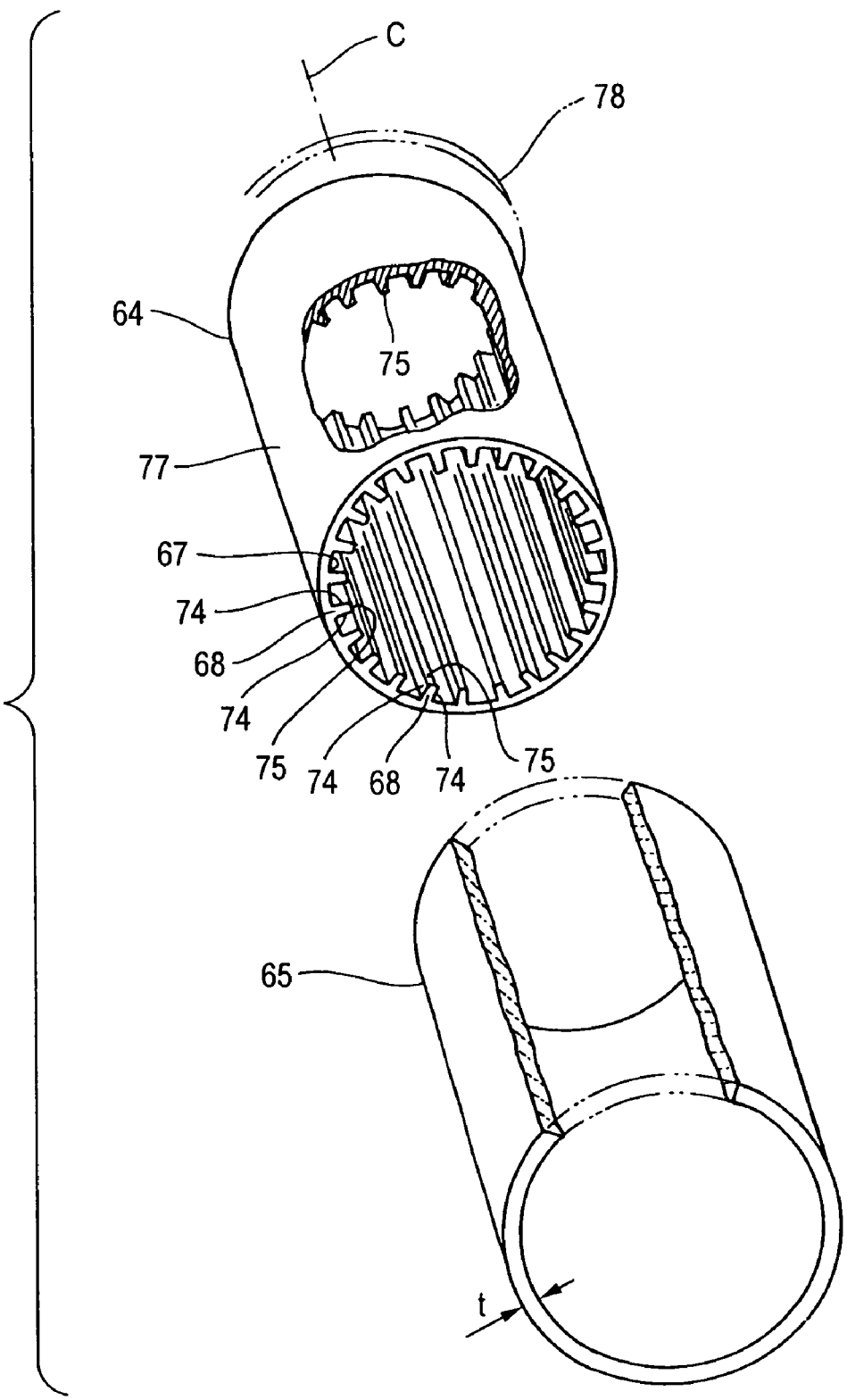
FIG. 5 is a perspective view which shows a cover and a heat insulation material adopted on the solenoid valve of the exemplary, non-limiting compressed gas storage system of the invention.

FIG. 5 is a perspective view which shows the cover and the heat insulation material which are adopted on the solenoid valve of the compressed gas storage system of the invention. The cover and the heat insulation material will be described by reference to FIG. 3 in parallel with FIG. 5.

The fin 68 is a portion which is formed into a straight line in parallel with a center axis C of the solenoid valve and is such that side portions 74, 74 are formed in such a manner as to continue to the inner circumferential surface 67 and a top portion 75 is formed continuously from the side portions 74, 74 in such a manner as to be brought into contact with an outer circumferential surface 76 of the solenoid case 55 of the solenoid valve. Thus, heat in the solenoid valve is transferred directly to the top portion 75, and heat so transferred from the solenoid valve is dissipated from a heat dissipating surface (which doubles as the gas flow path 71) made up of the side portions 74, 74 and the inner circumferential surface 67.

The heat insulation member 65 has a thickness t and prevents heat dissipation from an outer circumferential surface 77 of the cover 64.

Note that while the gas flow path 71 is formed into the straight line, the gas flow path 71 can be formed into a spiral shape on the inner circumferential surface 67 of the cover 64. By forming the flow path 71 into the spiral shape, a contact area between the gas flow path 71 and the solenoid valve is increased, and a further increase in temperature of compressed gas which flows therethrough can be expected.

In addition, by forming the flow path 71 into the spiral shape and making the flow path so formed thin, the flow path 71 can be made to double as a filter (which removes impurities).

While the cover 64 has formed thereon no fastening portion, whether to have a fastening portion is arbitrary, and it is possible to form, for example, a fastening flange 78 as indicated by chain double-dashed lines in FIG. 5.

Whether to mount the heat insulation material 65 is arbitrary.

Next, the function of the compressed gas storage system of the invention will be described below.

Figure 6:
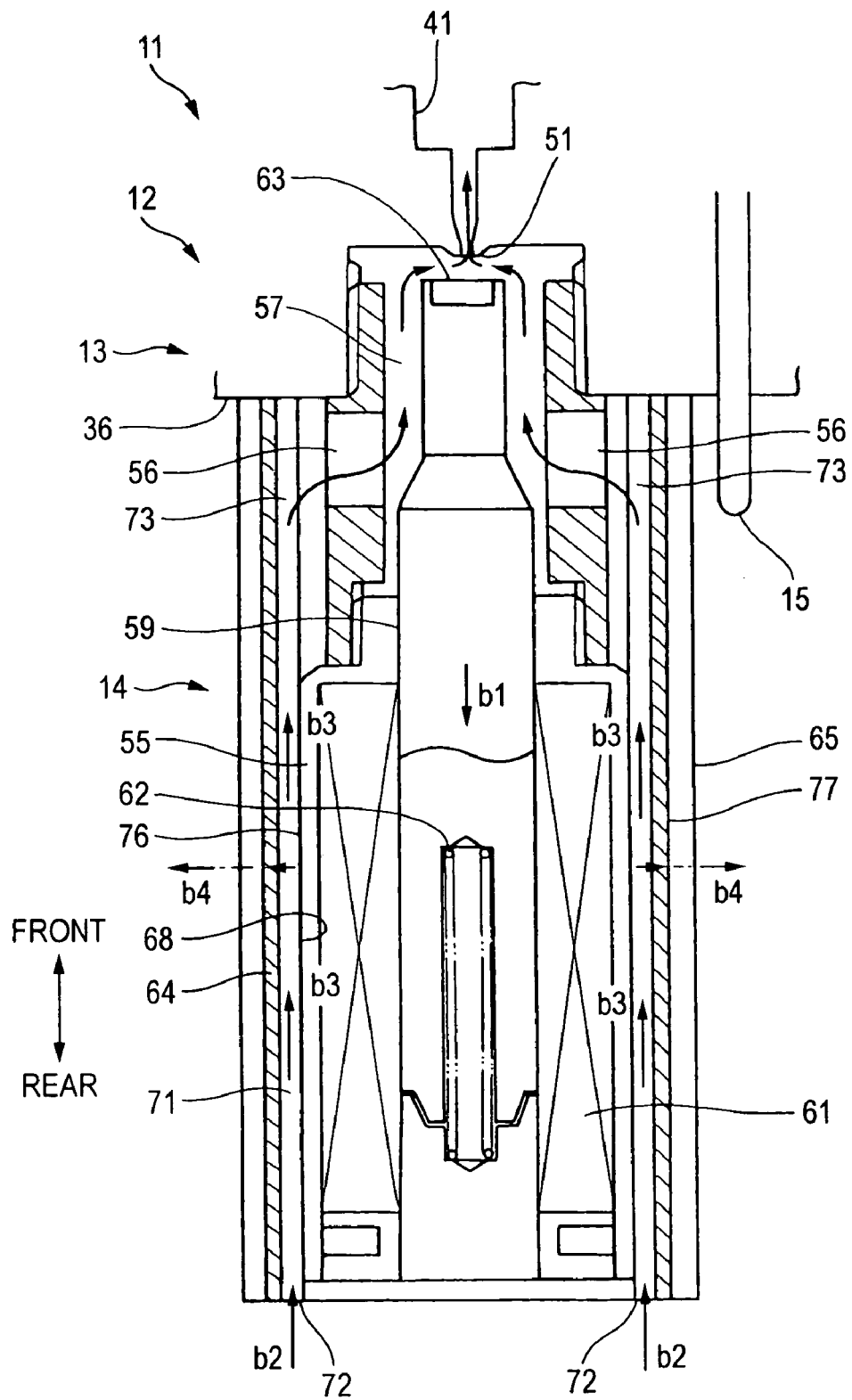
FIG. 6 is a drawing which illustrates the function of the exemplary, non-limiting compressed gas storage system of the invention.

FIG. 6 is a drawing which illustrates the function of the compressed gas storage system of the invention. The description of the function thereof will be made by reference to FIG. 1, as well.

When the control unit 16 causes the solenoid valve 14 to be energized so as to excite the solenoid valve 14, since the plunger 59 slides rearwards as indicated by an arrow b1 against the return spring 62, so as to separate the seated material 63 fitted in the front end of the plunger 59 apart from the seat portion 51, the solenoid valve 14 is brought into an open state, and compressed gas within the gas tank 12 flows in from the inlet portions 72 . . . of the gas flow paths 71 . . . as indicated by arrows b2 . . . , passes through the gas flow paths 71 . . . as indicated by arrows b3 . . . , passes then from the outlet portions 73 . . . through the two outlets 56, 56, is guided further into the flow path portion 57, and eventually flows into the gas discharge path 41.

As this occurs, since heat generated by the solenoid (the electromagnetic coil 61) is transferred to the compressed gas which passes through the gas flow paths 71 . . . by the outer circumferential surface 76 of the solenoid case 55 and the fins 68 . . . which are formed on the cover 64, the temperature of the compressed gas passing through the gas flow paths 71 . . . can be increased. As a result, a decrease in temperature of the seated material 63 fitted in the front end of the plunger 59 can be suppressed, thereby making it possible to enhance the sealing property of the solenoid valve 14 without altering the material of the seal material 63.

Thus, according to the compressed gas storage system 11, since the system includes the gas tank 12 formed for storing therein compressed gas, the gas discharge path 41 provided in the gas tank 12, the solenoid valve 14 connected to the gas discharge path 41 and disposed in the interior of the gas tank 12 for controlling the flow of compressed gas that goes out of the gas tank 12 and the control unit 16 to which the solenoid valve 14 is connected, and the outer circumferential surface 76 of the solenoid valve 14 is covered with the cover 64, so that the space defined between the cover 64 and the outer circumferential surface 76 is made to communicate with the gas discharge path 41 to thereby form the gas flow paths 71 . . . , the temperature of the compressed gas which passes through the gas flow paths 71 . . . can be increased by heat generated by the solenoid valve (the electromagnetic coil 61). As a result, a decrease in temperature of the seated material 63 fitted in the front end of the plunger 59 can be suppressed, whereby the sealing property of the solenoid valve 14 can be enhanced without changing the material of the sea material.

In addition, since heat dissipation from the outer circumferential surface 77 of the cover can be suppressed as indicated by arrows b4 . . . , the temperature of the cover 64 is made difficult to be decreased, whereby the temperature of the compressed gas which passes through the gas flow paths 71 . . . can be increased in the ensured fashion. Consequently, the sealing property of the solenoid valve 14 can be enhanced.

Furthermore, when the thermocouple 15 detects the temperature of compressed gas in the vicinity of the solenoid valve 14 within the gas tank 12, the control unit 16 compares information (the detected temperature) obtained by the thermocouple 15 with a lower limit temperature set therein in advance. Then, when finding that the temperature of compressed gas is lower than the lower limit temperature, the control unit 16 increases current fed into the solenoid valve 14 According to the third aspect of the invention, and therefore, the temperature of the electromagnetic coil 61 of the solenoid valve 14 is increased, and as a result, the temperature of compressed gas which passes through the gas flow paths 71 . . . can be increased in the ensured fashion. Consequently, the sealing property of the solenoid valve 14 can be enhanced.

Thus, according to the compressed gas storage system 11, since the temperature detection unit (thermocouple) 15, which detects a temperature within the gas tank 12, is disposed in the vicinity of the solenoid valve 14 and the control unit 16 increases the amount of energization when it finds that the temperature detected by the temperature detection unit (thermocouple) 15 is lower than the temperature set therein in advance, the temperature of the solenoid valve 14 is increased in accordance with the temperature of compressed gas, whereby compressed gas which passes through the gas flow paths 71 . . . can be heated in the further ensured fashion. Consequently, the sealing property of the solenoid valve 14 can be enhanced further.

Next, another mode for carrying out the invention or embodiment thereof will be described below.

Figure 7:
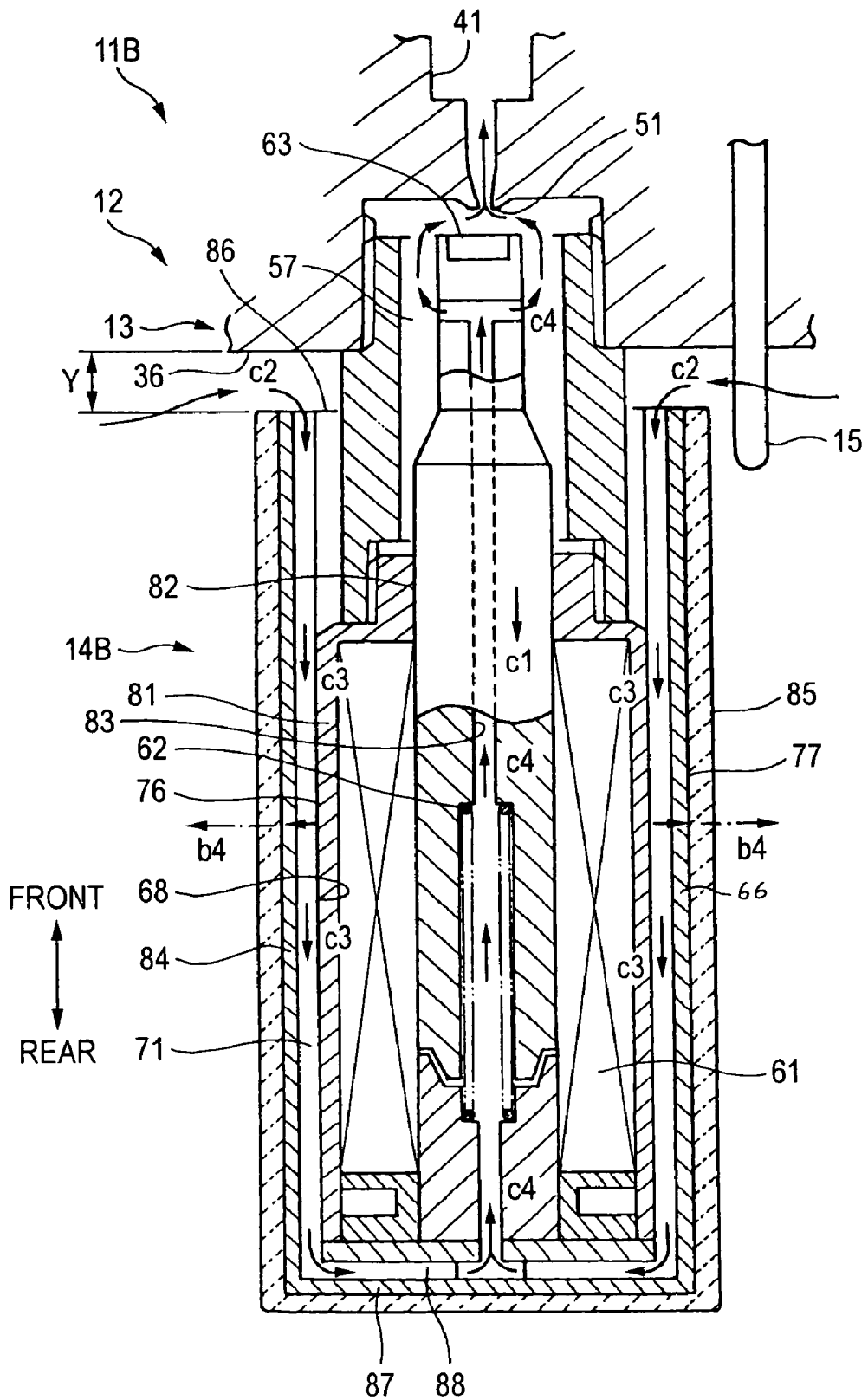
FIG. 7 is a drawing which illustrates the function of a compressed gas storage system of another exemplary, non-limiting embodiment of the invention.
Figure 8A:
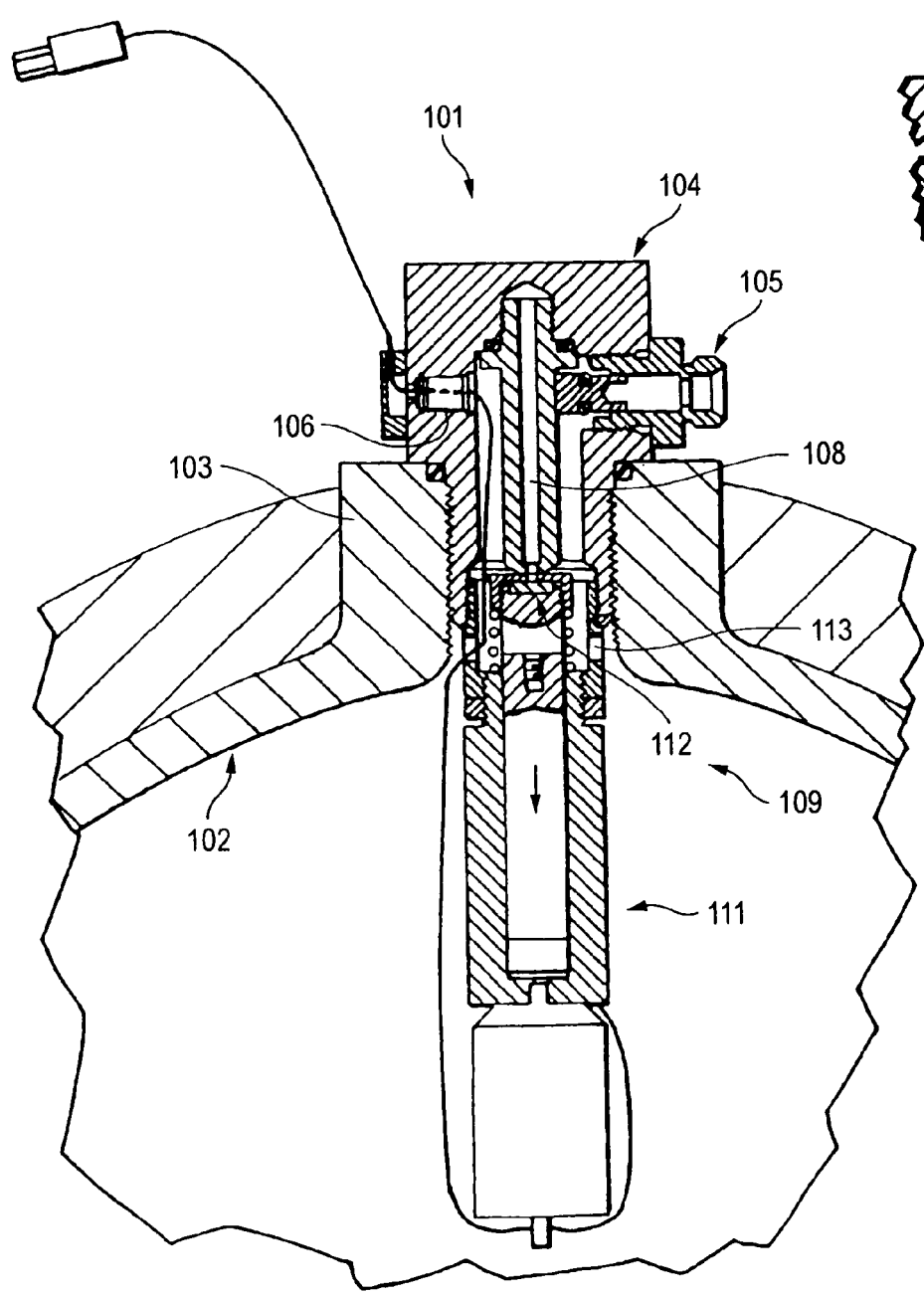
FIGS. 8(a), 8(b) are drawings which explains a basic configuration of a related art compressed gas storage system.
Figure 8B:
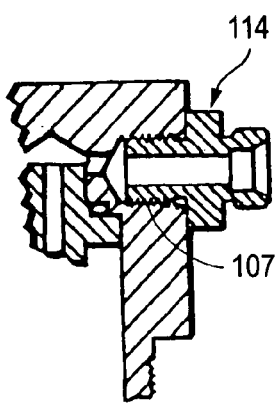

FIG. 7 is a drawing which illustrates another embodiment of the invention. Like reference numerals will be imparted to like constituent members to those of the embodiment shown in FIGS. 1 to 5, and the description thereof will be omitted.

A compressed gas storage system 11B of another embodiment includes a solenoid valve 14B.

The solenoid valve 14B includes, as a characteristic thereof, a solenoid case 81, a plunger 82, a central gas flow path 83 formed at the center of the solenoid case 81 and the plunger 82, a cover 84 which covers an outside of the solenoid case 81, and a heat insulation material 85 which covers an outside of the cover 84.

The cover 84 is such that an opening 86 is formed at one end of a cylindrical main body 66, a bottom portion 87 is formed at the other end of the cylindrical main body 66, flow paths 88 . . . which communicate with gas flow paths 71 . . . are formed in the bottom portion 87, and the low paths 88 . . . are made to communicate with the central gas flow path 83, and the cover 84 is disposed in such a manner that the opening 86 is spaced apart a distance Y from a coupling unit 13.

Note that fins (refer to the fins 68 . . . in FIGS. 3 to 5), not shown, are formed on an inner circumferential surface of the cover 84.

The heat insulation material 85 covers the cylindrical main body 66 and the bottom portion 87 of the cover 84 to thereby prevents heat from being dissipated outward of the cover 84.

Next, the function of the other embodiment will be described below by reference to FIG. 1, as well.

When the control unit 16 causes the solenoid valve 14 to be energized so as to excite the solenoid valve 14, since the plunger 82 slides rearwards as indicated by an arrow c1 against a return spring 62, so as to separate a seated material 63 fitted in a front end of the plunger 82 apart from a seat portion 51, the solenoid valve 14 is brought into an open state, and compressed gas within the gas tank 12 flows in from the opening 86 of the cover as indicated by arrows c2 . . . , following this, passes through the gas flow paths 71 . . . as indicated by arrows c3 . . . , passes then from the low paths 88 . . . in the bottom portion 87, passes through the central gas flow path 83 as indicated by arrows c4, is guided further into a flow path portion 57, and eventually flows into a gas discharge path 41.

As this occurs, since heat generated by the solenoid (an electromagnetic coil 61) is transferred to compressed gas which passes through the gas flow paths 71 . . . , the temperature of the compressed gas passing through the gas flow paths 71 . . . can be increased. In particular, since the gas flow path 71 can take a sufficient flow path area compared to the central gas flow path 83, the compressed gas which passes through the gas flow paths 71 . . . can be heated in an ensured fashion. As a result, a decrease in temperature of the seated material 63 fitted in the front end of the plunger 82 can be suppressed, thereby making it possible to enhance the sealing property of the solenoid valve 14 without altering the material of the seal material 63.

The compressed gas storage system according to the invention can suitably be applied to a solenoid valve which is disposed within a pressure vessel which stores therein compressed gas.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

I claim:

1. A compressed gas storage system comprising:
   a gas tank formed for storing therein compressed gas;
   a gas discharge path provided in the gas tank;

a solenoid valve connected to the gas discharge path and disposed in an interior of the gas tank for controlling the flow of compressed gas that goes out of the gas tank;

a control unit to which the solenoid valve is connected;

an outer circumferential surface of the solenoid valve is covered with a cover; and a space defined between the cover and the outer circumferential surface, wherein the space communicates with the gas discharge path to form a gas flow path.

2. A compressed gas storage system as set forth in claim 1, wherein an outer circumferential surface of the cover is covered with a heat insulation material.

3. A compressed gas storage system as set forth in claim 1, wherein a heat transfer fin is formed on an inner circumferential surface of the cover in such a manner as to extend radially inwardly, and brought into contact with the outer circumferential surface of the solenoid valve.

4. A compressed gas storage system as set forth in claim 2, wherein a heat transfer fin is formed on an inner circumferential surface of the cover in such a manner as to extend radially inwardly, and brought into contact with the outer circumferential surface of the solenoid valve.

5. A compressed gas storage system as set forth in claim 1, further comprising:

a temperature detection unit for detecting a temperature within the gas tank that is disposed in the vicinity of the solenoid valve, wherein when a temperature detected by the temperature detection unit is lower than a temperature set in the control unit in advance, the control unit increases the amount of energization.

6. A compressed gas storage system as set forth in claim 2, further comprising:

a temperature detection unit for detecting a temperature within the gas tank that is disposed in the vicinity of the solenoid valve, wherein when a temperature detected by the temperature detection unit is lower than a temperature set in the control unit in advance, the control unit increases the amount of energization.

7. A compressed gas storage system as set forth in claim 3, further comprising:

a temperature detection unit for detecting a temperature within the gas tank that is disposed in the vicinity of the solenoid valve, wherein when a temperature detected by the temperature detection unit is lower than a temperature set in the control unit in advance, the control unit increases the amount of energization.

8. A compressed gas storage system as set forth in claim 4, further comprising:

a temperature detection unit for detecting a temperature within the gas tank that is disposed in the vicinity of the solenoid valve, wherein when a temperature detected by the temperature detection unit is lower than a temperature set in the control unit in advance, the control unit increases the amount of energization.

9. A compressed gas storage system as set forth in claim 1, wherein the solenoid valve has a seat material fitted on a toe of a plunger of the solenoid valve.

10. A compressed gas storage system as set forth in claim 9, wherein the seat material is disposed after the space.

11. A compressed gas storage system as set forth in claim 9, wherein the seat material defines a movable seal.

12. A compressed gas storage system as set forth in claim 1, wherein the space directly communicates with the gas discharge path when the solenoid valve is in an open state.

* * * * *